Aug. 24, 1926.
T. J. NELSON ET AL
WIRE STRIPPING MACHINE
Filed March 13, 1922    3 Sheets-Sheet 1
1,597,460
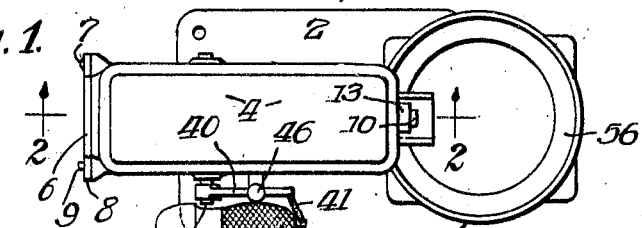
Fig. 1.
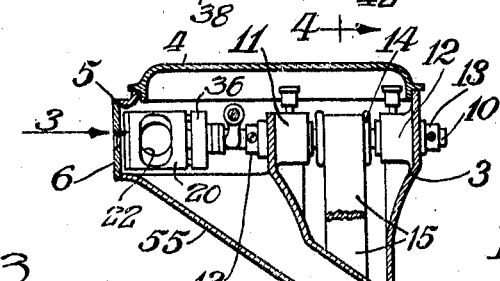
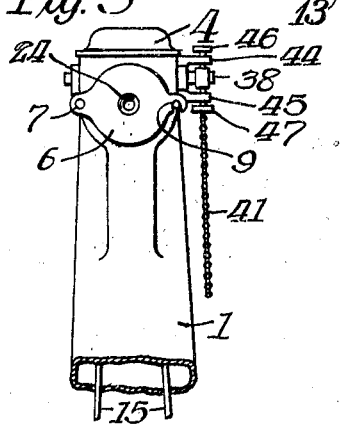
Fig. 3.
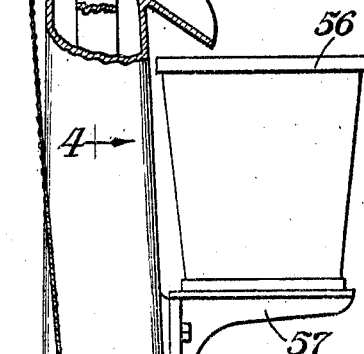
Fig. 2.
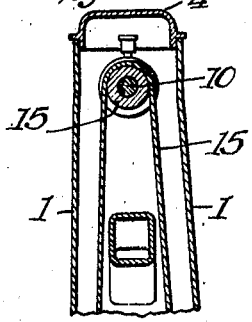
Fig. 4.
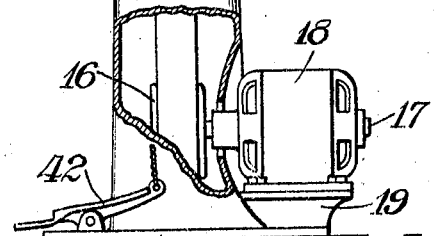
Inventors:
Theodore J. Nelson
Eugene H. Joseph
By Fisher, Towle, Clapp & Soans Attys.

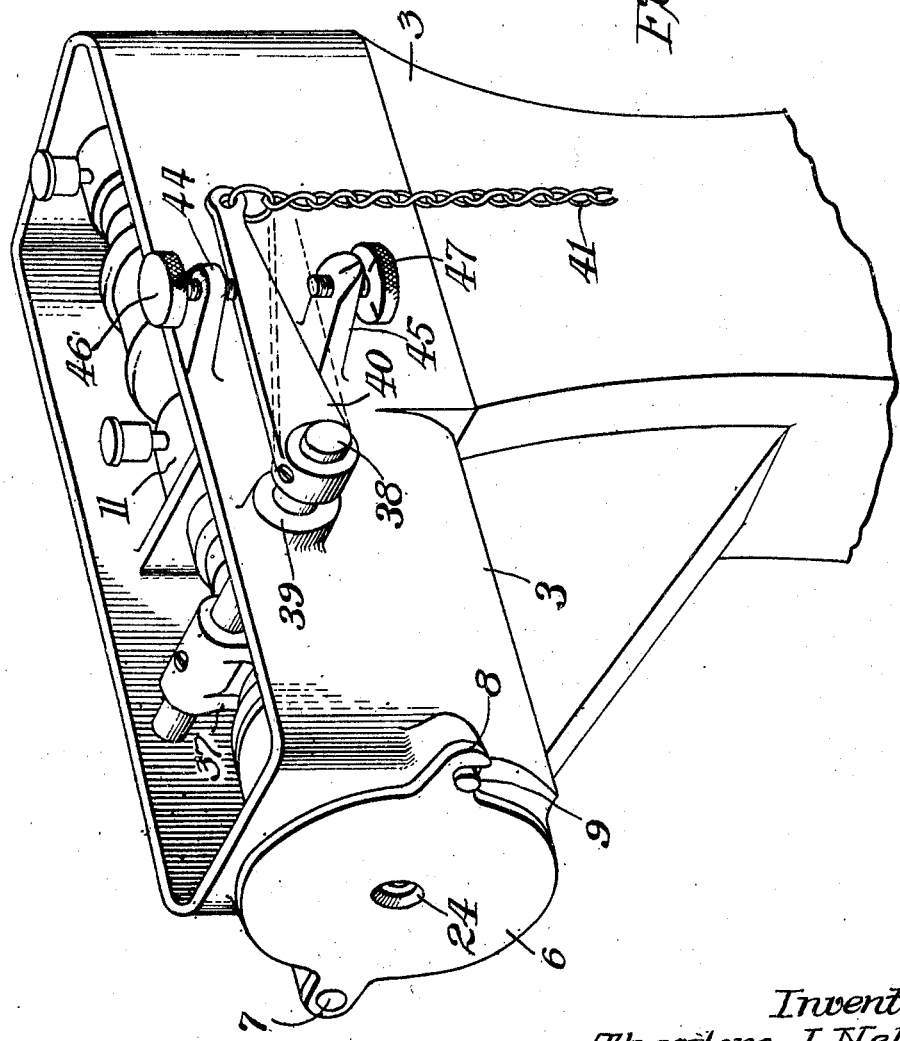

Aug. 24, 1926.
T. J. NELSON ET AL
1,597,460
WIRE STRIPPING MACHINE
Filed March 13, 1922   3 Sheets-Sheet 3
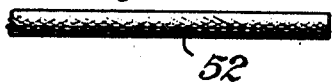
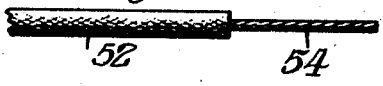
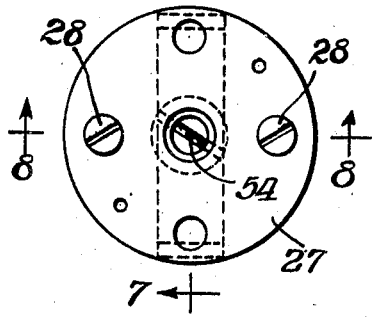
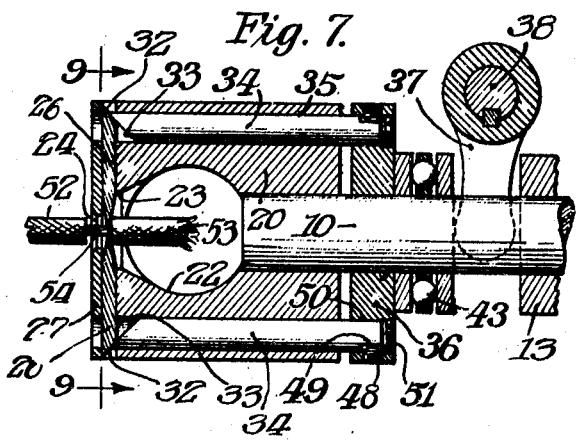
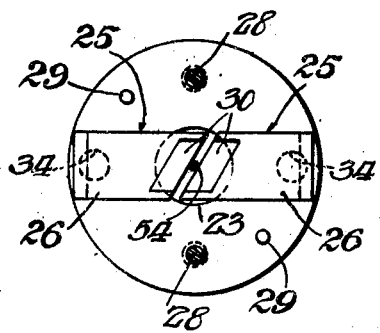
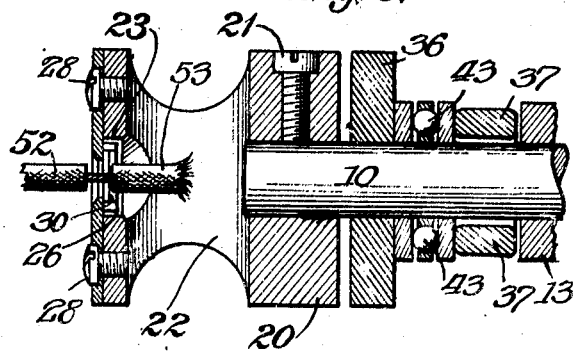
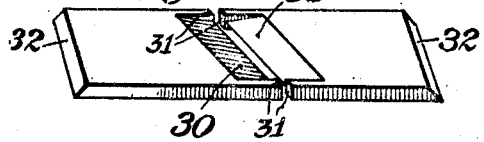
*Inventors:*
*Theodore J. Nelson*
*Eugene H. Joseph*
By *Fisher, Towle, Clapp & Soans* Attys Patented Aug. 24, 1926.

1,597,460

UNITED STATES PATENT OFFICE.

THEODORE J. NELSON AND EUGENE H. JOSEPH, OF CHICAGO, ILLINOIS, ASSIGNORS TO COLONIAL LAMP & FIXTURE WORKS, INC., OF CHICAGO, ILLINOIS, A CORPORATION OF ILLINOIS.

WIRE-STRIPPING MACHINE.

Application filed March 13, 1922. Serial No. 543,264.

Our invention has reference more particularly to a machine for removing the insulation from the ends of electrical conductors so that the desired length of the latter is exposed for making the electrical connections.

The principal objects of our invention are to provide a dependable machine for conveniently removing the insulation from electrical conductors; to remove the insulation without damaging the conductor; to twist the strands of a standard conductor as the insulation is removed; to afford a convenient adjustment for adapting the machine to different sizes of wire; and in general, to provide a simple machine which is inexpensive and adapted to be used by an ordinary operator to rapidly and effectively remove the insulation from an electrical conductor.

On the drawings:

Fig. 1 is a top view of a machine embodying our invention;

Fig. 2 a side view with parts in section on the line 2—2 of Fig 1;

Fig. 3 a front view of the upper portion of the machine;

Fig. 4 a sectional view of the upper portion of the machine taken on the line 4—4 of Fig 2;

Fig. 5 an enlarged perspective view of the upper end or head of the machine with the cover plate removed;

Fig. 6 a front view of the stripper head;

Fig. 7 a sectional view of the stripper head on the line 7—7 of Fig. 6;

Fig. 8 a sectional view thereof on the line 8—8 of Fig. 6;

Fig. 9 a view similar to Fig. 6 taken on the line 9—9 of Fig. 7;

Fig. 10 a perspective view of the stripper knives;

Fig. 11 a fragmentary view of an insulated conductor before the insulation is removed; and Fig. 12 a similar view after the insulation has been removed by the machine.

Referring to the drawings, the reference numeral 1 indicates a hollow standard which has a base 2 at the lower end whereby the standard may be secured to the floor, and this standard is formed at the upper end with a forwardly extended housing 3 which is open at the top and adapted to be closed by a detachable cover plate 4. At the forward end the housing 3 has a large opening 5, closed by a door 6 which is hinged at one side of the opening 5, as indicated at 7, and at the other side has a hook 8 which engages a pin 9 projecting from the forward end of the housing 3. A shaft 10 is journaled in the housing 3 in bearings 11 and 12, being held against longitudinal movement by the collars 13. Between the bearings 11 and 12 a pulley 14 is fixed on the shaft 10 and connected by the belt 15 to the pulley 16 which is secured on the inner end of the shaft 17 of the motor 18 which latter is mounted on an extension 19 of the base 2.

A cutter head 20 is secured to the forward end of the shaft 10, just inside the front plate 6 by the set screw 21, and has a large diametrical passageway 22 at the forward end and an axial opening 23 at the front in line with an aperture 24 of the plate 6 and communicating with the dametrical passageway 22. The front face of the cutter head 20 is milled out diametrically to provide grooves 25 in which a pair of knives 26 are slidably held by a cover plate 27, which latter is secured by screws 28 to the cutter head 20 and located in proper position by dowel pins 29 which engage corresponding apertures in the outer end of the head 20. The knives 26 have the inner ends sharpened, as shown, with the cutting edges 30 extending obliquely of the width thereof and to the line of movement of the knives 26 in the grooves 25 so as to have a shearing action or drawing cut on an article interposed therebetween when the cutter head 20 is rotated. It will also be noted that the cutting edges 30 are shown centrally positioned to provide abutments 31 at the sides adapted to contact and limit the movements of the knives toward each other and prevent overlapping and jamming of the beveled cutting edges when moved together.

The outer ends of the knives 26 are beveled as indicated at 32, and adapted to be engaged by the correspondingly beveled forward end or camming faces 33 of axially movable cams or camming pins 34 which slide longitudinally in the bored out openings 35 of the head and are connected at their rear ends to a cross head or plate 36. The cross head 36 is loosely mounted on the shaft 10 so as to slide longitudinally or axially thereon, being caused to rotate with the shaft by reason of the connection of the pins 34 with the rotatable head 20, and this cross head or plate is engaged at the rear end by a shifter fork 37 which is fixed on a transverse shaft 38, which latter is journaled in bearings 39 formed on the side walls of the housing 3. A crank arm 40 is secured to the outer end of the shaft 38 and connected by a chain 41 or other suitable means to a foot lever 42 which latter may be pressed downwardly to operate the shaft 38 through the chain connection 41 and crank 40 and rock the shifter fork 37 so as to slide the cross head or plate 36 forwardly on the shaft 10 and project the pins 34 forwardly, thereby causing the latter to impel the knives 26 inwardly to approach one another and by the structure shown, to the same extent. A ball bearing 43 is preferably interposed between the shifter fork 37 and the rear end of the cross head or plate 36 so as to minimize the friction between said shifter fork and the rotating cross head 36. On the outer side of the housing 33 are a pair of lugs 44 and 45 between which the lever 40 operates and these lugs carry adjusting screws or stops 46 and 47 respectively for limiting the oscillatory movement of the crank arm 40.

The pins 34 which control the knives 26 are adjustably connected to the cross head or plate 36 by set screws 48 which engage flat faces 49 of the pins to lock the latter in apertures 50 of the cross head, and we prefer to have a threaded plug 51 in the rear end of the opening 50 for effecting a fine adjustment of the pins 34.

In using this machine, the motor 18 is set in operation and the shaft 10 and cutter head 20 continuously driven at a high rate of speed so that the centrifugal force impels the knives 26 outwardly against the beveled faces 33 of the pins 34, thereby forcing the pins rearwardly and rocking the shaft 38 so as to hold the crank arm 40 up against the stop screw 46, which latter is adjusted to afford sufficient separation of the knives 26 and maintain the ends of the pins 34 in engagement with the outer ends of said knives. The end of the conductor 52 from which the insulation is to be removed is inserted through the aperture 24 of the cover plate 6 and through the aperture of the plate 27 between the inner ends of the knives 26, which latter are held apart by centrifugal force, and when inserted the proper distance, the pedal 42 is depressed so as to pull the crank arm 40 down into contact with the lower adjusting or stop screw 47, which lattter has been adjusted so as to permit inward movement of the knives to cut through the insulation wire and barely touch the outer surface of the conductor without injuring the latter, and this operation rocks the shaft 38, causing the shifter yoke 37 to force the cross head or plate head 36 and the pins 34 forwardly so that the engagement of the sliding faces 33 thereof with the bevel faces 32 of the knives 26 wedges the knives 26 inwardly. After the wire 52 has been inserted between the knives 26 and the pedal depressed, the wire is pulled outwardly while the pedal is held down so that the cut off end of insulation which is indicated at 53 in Fig. 8, is pulled off of the end of the wire by the rapidly rotating knives 26, and this stripping operation, in the case of standard wire results in a twisting of the wire strand, as shown at 54 in Fig. 12 so that the strands are firmly twisted together in a convenient form to make connections. The cut off end of the insulation after it is free from the wire is thrown off through the diametrical opening 22 of the cutter head 20 into the interior of the housing 3 and drops down into the upper end of a chute 55 which leads through the standard 1 between the two lengths of the belt 15 to the rear of the standard 1 and discharges into a receptacle 56 which is supported on a bracket 57 of the standard 1.

While we have shown and described our invention in a preferred form, we are aware that various changes and modifications may be made wthout departing from the principles of our invention, the scope of which is to be determined by the appended claims.

We claim as our invention:

1. In a machine for stripping insulation from wire, the combination of a rotatable member having radial gudies, cutters slidable in said guides to and from the axis of rotation of said member, and cam mechanism operable during rotation of said member to simultaneously slide the cutters inwardly in their guides with respect to the rotatable member to the same extent toward the axis of rotation of said member through only the insulation of the wire.

2. In a machine for stripping insulation from wire, the combination of a rotatable member having radial guides, a plurality of cutters slidable in said guides to and from the axis of rotation of said member, and means shiftable axially of said member and having separate cams engaging the cutters for adjusting said cutters to and from the axis of rotation.

3. In a machine for stripping insulation from wire, the combination of a rotatable head having radial guides, a pair of cutters slidable along said guides to and from the axis of rotation of said member, a pair of independently adjustable cam members movable axially of said member and engaging the cutters for adjusting same, and means movable, at the will of the operator, during rotation of said member for simultaneously operating said cam members.

4. In a machine for stripping insulation from wire, the combination of a frame having a shaft mounted to rotate therein, a cutter head on said shaft having radial guides, a pair of cutters slidable respectively in said guides to and from the axis of rotation of said cutter head, a cross head movable axially along the shaft and having a pair of rods extending forwardly therefrom and engaging the cutters to slide same inwardly toward the axis of rotation of the cutter head, means for sliding the cross head along the shaft, and a stop adjustable while the cutter head is rotating for limiting the inward thrust of the cutters.

5. In a wire stripping machine for removing insulation from wire, the combination of a continuously rotating shaft, a cutter head fixed to the shaft, opposed cutters slidable in the head substantially perpendicular to the axis of the shaft and movable to and from the same, means operable during the rotation of said shaft and head for forcing the cutter toward the axis of rotation, and a stop independent of the rotatable parts for limiting the inward movement imparted to the cutter.

6. In a machine for stripping insulation from wire, the combination of a rotatable member, a plurality of radially slidable cutters on said member movable simultaneously to and from the axis of rotation of said member and adapted to separate by centrifugal action, and parallel camming members carried by the rotatable member for adjusting the cutters relative to the wire during the rotation of the member.

7. In a machine for stripping insulation from wire, the combination of a rotatable member, a pair of cutters slidably mounted for movement perpendicularly of the axis of rotation of said member and away from the axis of rotation of said member by the centrifugal force thereof, and adjustable means for limiting the inward and outward movement of said cutters, said means being adapted for adjustment by the operator during rotation of said members.

8. In a machine for stripping insulation from wire, the combination of a frame having a shaft mounted to rotate therein, a cutter head on said shaft, a pair of opposed cutters slidably mounted on said head, a cross head movable axially along the shaft, rods for connecting the cross head and the cutters, whereby the latter are adjusted to and from the axis of rotation of the cutter heads, and means for limiting the movement imparted to the cutters toward the axis of the head.

9. In a machine for stripping insulation from wire, the combination of a frame having a shaft mounted to rotate therein, a cutter head on said shaft having aligned guides transversely of and perpendicular to the shaft, a pair of cutters slidable respectively in said guides to and from the axis of rotation of said cutter head confined within the periphery thereof, a cross head movable axially along the shaft and having a pair of parallel rods slidably mounted in the cutter head and extending forwardly therefrom through the cutter head and having beveled faces engaging the cutters to slide same inwardly toward the axis of rotation of the cutter head, means for sliding the cross head along the shaft, and a stop adjustable while the cutter head is rotating for limiting the inward thrust of the cutters.

10. In a machine for stripping insulation from wire, the combination of a continuously rotating member having guides, a pair of cutters slidable therein at the will of the operator to and from the axis of rotation of said member while said member is continuously rotated, camming means carried by the member for sliding the cutters in the guides to positively force them inwardly toward each other, and a stop for limiting the inward thrust of the cutters and the movement of the actuating means thereof, said stop being adjustable during rotation of the cutters and independently thereof.

THEODORE J. NELSON.
EUGENE H. JOSEPH.